United States Patent

[11] 3,598,199

| [72] | Inventors | Peter Mertens;<br>Ernst August Winkelholz, both of Bremen, Germany |
|---|---|---|
| [21] | Appl. No. | 751,875 |
| [22] | Filed | Aug. 12, 1968 |
| [45] | Patented | Aug. 10, 1971 |
| [73] | Assignee | Fried. Krupp Gesellschaft mit beschrankter Haftung<br>Essen, Germany |
| [32] | Priority | Aug. 12, 1967 |
| [33] | | Germany |
| [31] | | P 15 72 400.2 |

[54] REFLECTOR AND METHOD OF MAKING SAME
3 Claims, 1 Drawing Fig.

[52] U.S. Cl. .................................................. 181/.5 R,
340/8 FT
[51] Int. Cl. ..................................................... G10k 11/00

[50] Field of Search ............................................ 340/8 RT, 5
A; 181/.5

[56] References Cited
UNITED STATES PATENTS
| 2,811,216 | 10/1957 | Harris ........................ | 340/8 RT |
| 2,884,084 | 4/1959 | Sussman ..................... | 340/8 RT |
| 3,160,549 | 12/1964 | Caldwell et al. ............. | 340/5 A |

*Primary Examiner* — Rodney D. Bennett, Jr.
*Assistant Examiner* — Brian L. Ribando
*Attorney* — Spencer & Kaye ABSTRACT: Article for reflecting sound waves in water in which polyurethane foam is watertightly embedded in an outer casing formed of polyurethane casting resin embedding it in a casing of polyurethane casting resin. Method for producing such an article including heating the polyurethane foam to about 120°C.

3,598,199
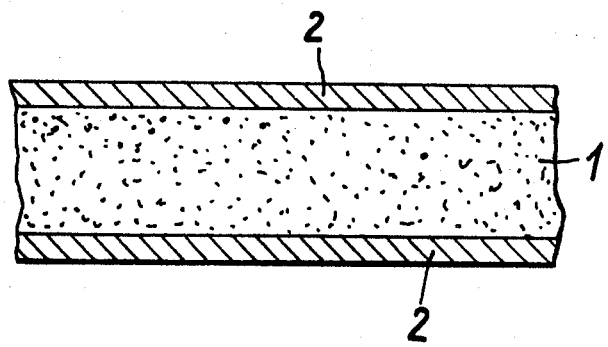
INVENTORS:
Peter Mertens
Ernst August Winkelholz
BY Spencer & Kaye
Attorneys

REFLECTOR AND METHOD OF MAKING SAME

BACKGROUND OF THE INVENTION

The present invention relates to sound wave reflectors for use in water, and, more particularly, to such reflectors which are to be used under high static pressure conditions. According to the present invention, such reflectors are formed of polyurethane foam embedded in polyurethane casting resin.

It is known that foam materials, for example, foam rubber, are suitable as reflectors for sound waves in water. They are used, for instance, as insulating layers on the rear sides of sonar transducers in order to prevent sonic radiation and/or reception from such rear sides.

The reflection characteristics for sound in water are determined by the amount of gas enclosed in the foam material. Under high static pressures the volumes of the cells in the foam material of known reflectors are reduced by compressive forces to such an extent that the sound reflection properties of the reflectors are lost. This is due to the fact that such pressure conditions, particularly when they last for a long period of time, bring sufficient forces to bear on the cells of the foam material so as to cause the gas enclosed by the individual cells, for example, air, to escape therefrom. Polyurethane foams also have sound reflection properties, however, unlike foam materials now employed in sound reflectors used in water, they are open-celled. This, of course, renders polyurethane foams unsuitable for use in water. Nevertheless, once the problem of how to prevent the incursion of water into such foams is solved, they have the advantage over other materials of being able to maintain their forms under relatively high static pressure conditions. This is due to the characteristically stiff structure of polyurethane foams. Thus, the sound reflector made of such foam will not lose its sound reflection properties under such conditions.

SUMMARY OF THE INVENTION

An object of the present invention is to provide a relatively simple sound wave reflector made of polyurethane foam for use in water, which will remain effective under high static pressure conditions.

In brief, the present invention relates to an article for reflecting sound waves in water which will also reflect sound waves even under relatively high static pressure conditions. The article of the present invention is characterized by an outer mold or casing of polyurethane casting resin in which polyurethane foam is embedded in a watertight manner. The elastic casing is chosen in order to shelter the foam core against the water.

The present invention also relates to a method for producing such sound wave reflectors.

BRIEF DESCRIPTION OF THE DRAWING

The sole drawing in the case shows an article for reflecting sound waves in water, according to the present invention.

DESCRIPTION OF THE PREFERRED EMBODIMENT

Referring to the drawing, a preferred form of the article of the present invention is shown therein. As can be seen a polyurethane foam material 1 is embedded in an outer mold or casing 2. The casing 2 is formed of a polyurethane casting resin. In this way, the article according to the invention is made watertight and an elastic surface results which does not affect the acoustical reflection properties of the polyurethane foam material 1. Furthermore, by thus embedding the polyurethane foam material 1 in the casing 2 a sound-reflecting article results which has very excellent resistance properties against mechanical and chemical stresses in water, particularly sea water.

Lacquers suitable for applying to the article are the polyurethane lacquers which are known commercially under such names as CUVERTIN (a product of the Henkel Co.), and DD-LACK (from several manufacturers), and DUPONT-ADIPRENE which is a casting resin suitable for the casing. Each of these is commercially available. Lacquering the article as described will enhance the watertight characteristic of the article as a whole.

The method for producing the article is relatively simple. The polyurethane foam material 1 is first heated to about 120° C. Then the heated polyurethane foam material is encased with casing 2. As described above, the casing 2 is formed of a polyurethane casting resin.

We claim:

1. Article for reflecting sound waves in water comprising in combination:
    a. an outer casing formed of polyurethane casting resin; and
    b. polyurethane foam watertightly embedded within said casing.

2. Method for producing sound wave reflectors for use in water comprising the steps of:
    a. heating polyurethane foam to about 120° C; and
    b. encasing said heated polyurethane foam with polyurethane casting resin.

3. Method for producing sound wave reflectors as defined in claim 4 wherein said encasing material itself serves as a casing protecting said polyurethane foam from water.